Fig. I.

United States Patent Office 3,833,647
Patented Sept. 3, 1974

3,833,647
PRODUCTION OF AROMATIC POLY-
CARBOXYLIC ACIDS
Abraham Perry Gelbein, Plainfield, Benjamin Joseph Luberoff, Upper Montclair, Morgan Chuan-Yuan Sze, Summit, and Richard T. Whitehead, Westfield, N.J., assignors to The Lummus Company, Bloomfield, N.J.
Filed Sept. 7, 1971, Ser. No. 178,382
The portion of the term of the patent subsequent to Dec. 4, 1990, has been disclaimed
Int. Cl. C07c 63/00, 63/26
U.S. Cl. 260—515 P
38 Claims

ABSTRACT OF THE DISCLOSURE

Aromatic polycarboxylic acids and their anhydrides are produced from the corresponding nitriles by aqueous catalytic hydrolysis with countercurrent stripping to produce an acid ammonium salt of the aromatic acid, followed by thermal decomposition of the salt to form the acid, and purification if necessary.

BACKGROUND OF THE INVENTION

This invention relates to the production of aromatic polycarboxylic acids and their anhydrides from the corresponding hydrocarbons or nitriles, and to the purification of the acids obtained. The process of this invention is particularly useful for preparing commercially important aromatic polycarboxylic acids such as phthalic acid, terephthalic acid, trimellitic acid and pyromellitic acid, and is especially useful for the production of terephthalic acid from terephthalonitrile and eventually from p-xylene, and its subsequent purification.

Various methods have been described for producing these compounds. For example, various benzene- and naphthalene-polycarboxylic acids have been made by oxidation of alkyl aromatic hydrocarbons with molecular oxygen over numerous catalysts. These compounds have also been obtained by catalytic oxidation of alkyl aromatic hydrocarbons with sulfur-containing compounds, as in U.S. Pat. 2,824,893, or with nitric acid. It has also been found that such acids may be produced by rearrangement of other mono- or polycarboxylic acids or their salts, when heated, see e.g., U.S. Pats. 2,863,914, 2,906,774 and 2,930,813. Other methods have been described for preparing the acids via the corresponding anhydride.

These processes have, in general, the disadvantage of producing, in addition to the desired acid, various by-products which must be separated from the acid, and whose separation may be difficult and/or costly. Acids such as terephthalic, isophthalic and pyromellitic acid, which are used as monomers in the manufacture of polyester fibers and synthetic resins, must be extremely pure or the polymers produced will be dark in color and may have unsatisfactory crystalline forms, unsuitably low melting points, and other undesirable properties. Similar high purity is required of acids used in the production of pharmaceuticals, such as diphenic acid.

For example, the oxidation of p-xylene produces a mixture of products composed principally of terephthalic acid, but also including compounds such as p-toluic acid, p-carboxybenzaldehyde, benzoic acid, and others, which must be removed before the product acid can be satisfactorily used for polymerization. Numerous patents and publications have described methods of purifying impure polycarboxylic acids such as by extraction of either the acid or the impurities with various solvents, further oxidation of the impurities by various oxidizing agents, distillation, fractional crystallization, heat treatments, etc. In a few cases in which these have been reduced to commercial practice they have proven to be costly.

Alternatively, it has been proposed in U.S. Pats. 2,979,526 and 3,031,500, to produce terephthalic and isophthalic acids by hydrolysis of the corresponding nitriles under pressure in a closed system, to form the diammonium salts, followed by thermal decomposition of the diammonium salts. A more recently proposed process for production of aromatic polycarboxylic acids from their nitriles is disclosed in Canadian Patent 834,234, in which an aromatic polynitrile undergoes a combined hydrolysis and steam stripping to produce the corresponding acid. It has been found, however that, at times the operation of this process requires large amounts of steam, which can adversely affect the process economics.

It is an objective, therefore, of this invention, to provide a process for the production of aromatic polycarboxylic acids. It is a further objective of this invention to provide a process for the production of aromatic polycarboxylic acids in which by-products, when formed, may be comparatively readily eliminated. It is a yet further object of this invention to provide such a process in which the major by-products formed can readily be converted into the desired product. Still a further object of this invention is the provision of a process for the production of aromatic polycarboxylic acids of sufficiently high purity to be suitable for the production of polyester fibers, synthetic resins, pharmaceuticals and the like. Another object of this invention is to provide such a process with reduced steam consumption.

SUMMARY OF THE INVENTION

Generally, these objectives are achieved by providing a process in which the desired polycarboxylic acid is produced from the corresponding nitrile. The nitrile may be obtained in any suitable fashion which will produce it in sufficiently high purity. It is particularly important that the nitrile to be used be substantially free of other nitriles. In the case of terephthalic acid, the terephthalonitrile to be used should be substantially free of tolunitriles or other phthalonitriles. A preferred method of obtaining the nitrile is by the reaction of an alkyl aromatic compound with ammonia in the absence of free oxygen and in the presence of a catalyst, as hereinafter described, followed by various steps designed to purify the nitrile, such as quenching, filtering, washing, etc.

The nitrile is subjected to a catalytic aqueous hydrolysis and a partial stripping of ammonia by countercurrent contact with steam or another suitable stripping gas to produce an acid ammonium salt or a mixture of acid ammonium salts of the acid. The salt thus formed is then subjected to a thermal decomposition step in which ammonia is removed, converting the salt to the free acid. An inert carrier gas may be employed to remove the ammonia evolved. The acid thus produced which may contain small amounts of nitrogen-containing intermediates may be subjected to further purification if necessary. Such purification is most advantageously attained by one or more steps in which the impure acid thus produced is treated with water at elevated temperature and pressure to convert nitrogen-containing compounds to the desired product.

In a particularly desirable embodiment, the invention comprises:

a continuous process for producing an aromatic polycarboxylic acid from the corresponding nitrile comprising:
(a) introducing a mixture of the nitrile, water and a catalyst selected from the group consisting of ammonia and ammonium salts into a hydrolysis vessel,
(b) maintaining the mixture in the vessel at a temperature of from about 250° F. to about 530° F. for 1 to 12 hours, (c) contacting the mixture during step (b) countercurrently with a stripping gas to partially strip ammonia therefrom,
(d) recovering an acid ammonium salt of the polycarboxylic acid,
(e) heating the acid ammonium salt from about 0.5 to about 10 hours at a temperautre of from about 300° F. to about 650° F. to produce the polycarboxylic acid and ammonia, and
(f) recovering the polycarboxylic acid.

By the term "acid ammonium salt" is meant an ammonium salt of the polycarboxylic acid in which one or more acid hydrogen atoms have not been replaced by an ammonium group. For example, the acid ammonium salt of terephthalic acid is monoammonium terephthalate, COOH—C₆H₄—COONH₄. Five possible acid ammonium salts of pyromellitic acid (1,2,4,5-benzenetetracarboxylic acid) exist—the monoammonium salt, three configurations of the diammonium salt, and the triammonium salt.

The aqueous hydrolysis of a nitrile group to a carboxyl group proceeds in the following manner:

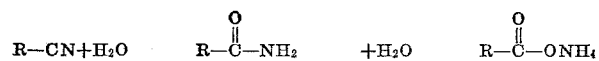

Consequently, two molecules of water are required to fully hydrolyze each nitrile group. In the case of a dinitrile, such as a phthalonitrile, four molecules of water are required to fully hydrolyze each molecule of nitrile.

In the case of terephthalonitrile, as disclosed in U.S. Pats. 2,979,520 and 3,113,964, the compound which would be produced by complete aqueous hydrolysis is diammonium terephthalate. However, the diammonium terephthalate thus produced is often found to be contaminated with other nitrogenous compounds which are intermediate products formed during hydrolysis, even if the hydrolysis is carried out for long periods of time. These compounds, if present in sufficient quantity, impart a dark color to any polymer made using the acid or the salt rendering it unsuitable for fiber use, although the acid itself may not show discoloration. Similarly, the hydrolysis of a higher polynitrile, such as pyromellitonitrile, will produce even more intermediate hydrolysis products owing to the greater number of nitrile groups to be hydrolyzed and the greater number of possible intermediate products.

BRIEF DESCRIPTION OF THE DRAWING

The invention is more fully described in the following description and drawings, in which.

DETAILED DESCRIPTION OF THE INVENTION

For convenience, the invention will be described in detail as relating to the preparation of terephthalic acid from terephthalonitrile. However, as mentioned above, the process is equally applicable to the production of numerous other aromatic polycarboxylic acids such as:

phthalic acid
isophthalic acid
trimellitic acid (1,2,4-benzenetricarboxylic acid)
trimesic acid (1,3,5-benzenetricarboxylic acid)
pyromellitic acid (1,2,4,5-benzenetetracarboxylic acid)
mellitic acid (benzenehexacarboxylic acid) and other benzenepolycarboxylic acids;
1,8- and 2,6-naphthalenedicarboxylic acids and other other naphthalene polycarboxylic acids;
diphenic acid (2,2'-biphenyldicarboxylic acid) and other polycarboxylic acids of diphenyl and of terphenyl, and aromatic polycarboxylic acids of other condensed ring structures such as anthracene, and polycarboxylic acids of heterocyclic rings such as furan, pyridine etc.

Also included within the products which can be prepared by the present process are aromatic polycarboxylic acids in which there are one or more substituents on the aromatic ring or rings in addition to the carboxyl group, such as alkyl, alkoxy, amino, halo, hydroxyl, nitro, etc., such as tetrachlorophthalic acid and 4-hydroxyisophthalic acid.

Figure 1:
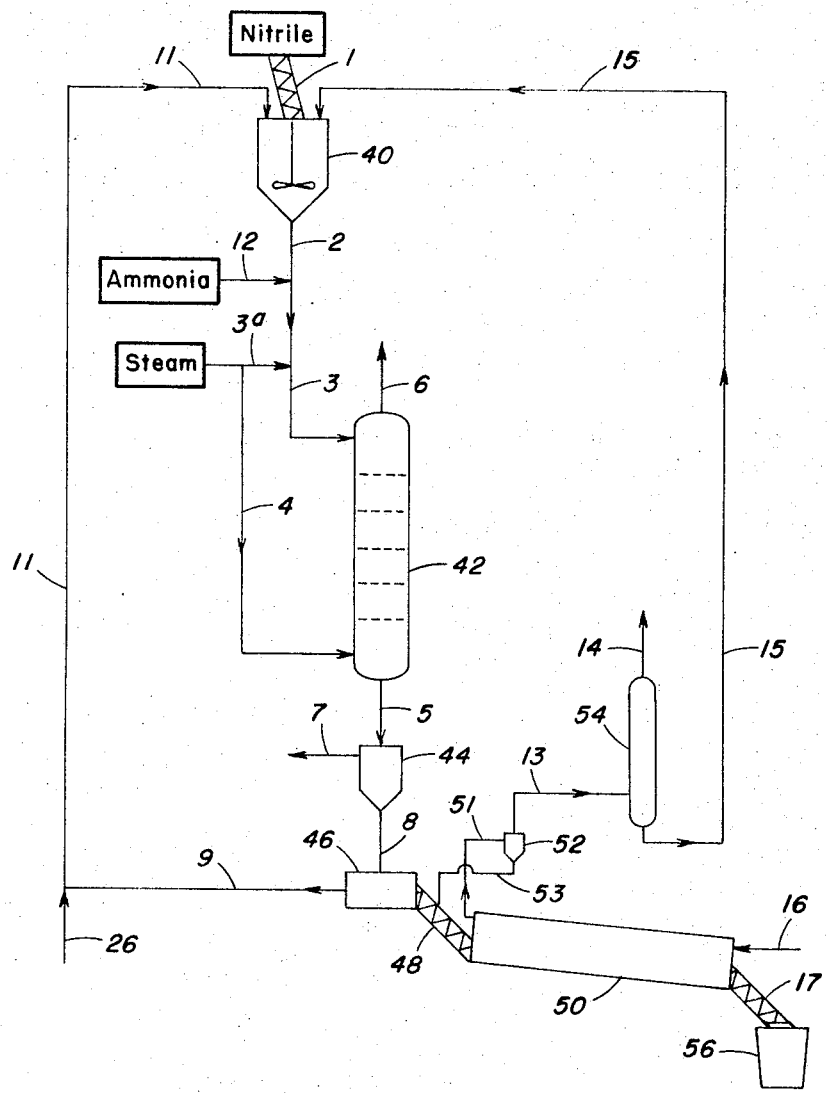
FIG. 1 is a general flow-sheet of the process for producing an acid from the corresponding nitrile.

FIG. 1 illustrates the process of the present invention. For convenience, it will be described herein in terms of the production of terephthalic acid from terephthalonitrile. The same steps and equipment, however, would be generally utilized in the production of any of the other aromatic polycarboxylic acids mentioned above.

Nitrile (terephthalonitrile) is introduced via line 1 into slurry tank 40 where it is slurried with water introduced through lines 11 and 15. The water used is preferably aqueous recycle streams from other portions of the process, as hereinafter shown, and, coming from such sources will contain varying amounts of ammonium salts of the product acid in solution (here, mono- and diammonium terephthalates), as well as the part-ammonium salt-part amide or -amides of the acid (e.g. ammonium terephthalamate) and other intermediate hydrolysis products as described hereafter. The slurry is then passed through lines 2 and 3 into the top section of a hydrolysis column 42. Prior to the introduction of the slurry into the hydrolysis column, high pressure steam may be injected into it through line 3a to raise the temperature. A second portion of high pressure steam is injected directly into the bottom of the column through line 4. The hydrolysis column 42 is preferably internally divided into several stages, which may range in number from 2–20, preferably 4–14. In the column, hydrolysis of the nitrile and steam stripping of ammonia from the hydrolysis product by countercurrent contact with the steam introduced in line 4 occur. Ammonia is progressively stripped from the hydrolysis mixture as it proceeds down through the various stages of the column, until the product leaving the column at the bottom including unchanged recycled salts, contains approximately 1.5 nitrogen atom per aromatic ring. Terephthalonitrile is converted in this manner, nearly completely to monoammonium terephthalate, although some ammonium terephthalamate and other compounds containing amide nitrogen, formed as intermediates during hydrolysis, may remain in the product. Additionally, some of the diammonium terephthalate introduced as recycle may be partially stripped to the monoammonium salt.

The reaction is conducted at temperatures of between about 250° F. to about 530° F., preferably between about 350° F. to about 480° F., at a residence time of 1–12 hours, preferably 3–8 hours and at the autogenous pressure of the system, which varies according to the steam pressure and temperature and the concentration of materials in the feed to the column but usually is between 65 and 885 p.s.i.a. In a preferred manner of operation, ammonia is also injected into the slurry, through line 12 or into the top or the middle of the column. It has been found that the addition of ammonia to the slurry in an amount of about 1 to 5 mole percent based on the water present in the total mixture results in a substantial increase in the rate of the hydrolysis reaction. The recycled ammonium salts will also aid in achieving this effect. This effect can be enhanced by maintaining a high ammonia concentration at the top of the column for example, by injecting additional ammonia into the column or by bleeding off some of the stripping steam before it reaches the top of the column. Ammonia and steam are removed from the top of column 42 in line 6.

While steam is the preferred stripping gas, any gas which is inert with respect to the reactants and materials in the hydrolyzer, and does not condense at these temperatures and pressures may be used. Suitable gases are nitrogen, hydrocarbons such as methane, propane, propylene and ethylene, and fluorocarbons such as the Freon series.

The product of the combined hydrolysis and stripping comprises an aqueous slurry of monoammonium terephthalate, diammonium terephthalate, and partially hydrolyzed products of terephthalonitrile which contain combined nitrogen. The product is withdrawn from the bottom of column 42 through line 5 and passed to flash tank 44 where part of the water is flashed off in line 7. The temperature of the slurry is thus reduced to permit the recovery of the nearly insoluble monoammonium terephthalate by centrifugation.

The slurry is then passed via line 8 to centrifuge 46 in which the monoammonium terephthalate is separated from the aqueous phase. The centrifugate, containing predominantly dissolved unchanged diammonium terephthalate and ammonium terephthalamate, with some monoammonium terephthalate, is removed in line 9, combined with other recycle aqueous streams, as from line 26, and recycled through line 11 to nitrile slurry tank 40.

The monoammonium terephthalate recovered from centrifuge 46 is then heated to dry it and to decompose it to terephthalic acid and ammonia. The preferred method of heating, as shown in FIG. 1, is in an inclined rotary kiln 50. The heating may also be carried out in a fluidized bed, in which it is preferably performed in several stages.

The monoammonium terephthalate is carried by conveyor 48 from centrifuge 46 to kiln 50, where it is heated by indirect heat transfer, for example by high pressure steam or other heating media passing through tubes within the kiln, or by wholly or partially enclosing the kiln inside a furnace. Proper decomposition of the monoammonium terephthalate requires residence time in the kiln of 0.5 to 10 hours, preferably 0.5 to 5 hours, at a temperature of 300°–650° F., preferably 450°–575° F. Ammonia evolved during the decomposition is continuously removed by sweeping the kiln with a suitable stripping gas, such as steam, introduced at 16, or by maintaining a vacuum in the kiln.

In the case of acids capable of forming anhydrides by condensation of two adjacent carboxyl groups, such as phthalic, pyromellitic and trimellitic acids, the thermal decomposition of the acid ammonium salts may cause dehydration of some of the free acid formed, producing the corresponding anhydride. In the case of acids such which may form multiple anhydrides, such as pyromellitic acid, a mixture of anhydrides may occur, along with the free acid. The acid can of course be produced, if desired, by simply adding water to the decomposition product. In some cases it may be desirable to produce the acid in the form of its anhydride. This can be accomplished by controlling the conditions of the thermal decomposition step.

The stripped ammonia leaves the kiln in line 51. Entrained solids are removed in cyclone 52 and returned to the conveyor in line 53. The gases then pass through line 13 to scrubber 54 for further removal of solids and if steam was used as the stripping gas, condensation to form water. The scrubber bottoms are removed in line 15 and recycled to the nitrile slurry tank 40. The uncondensed gases including ammonia leave the scrubber in line 14.

Dry terephthalic acid is recovered from the outlet end of the rotary kiln, removed in conveyor 17 and collected in hopper 56.

Figure 2:
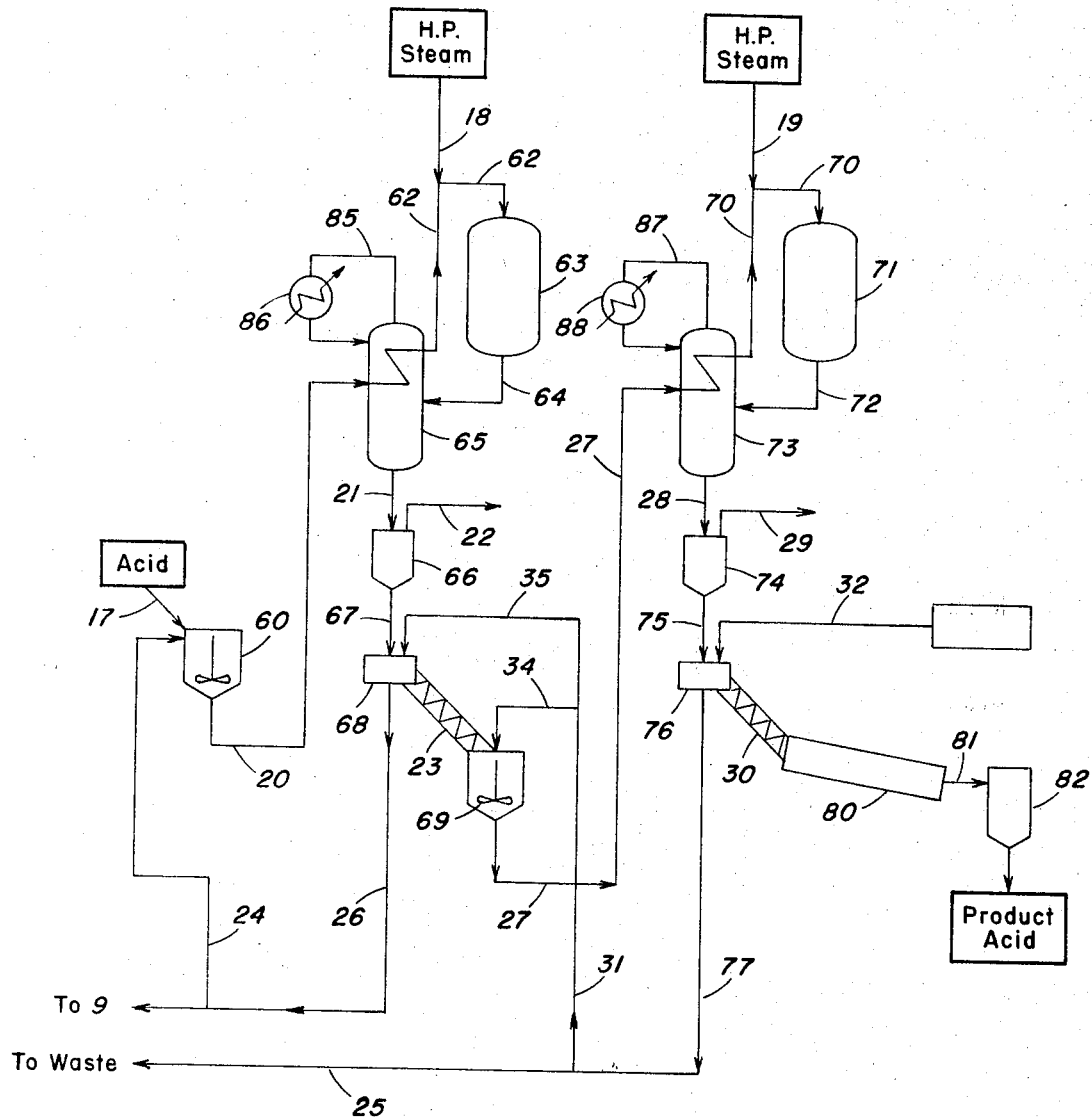
FIG. 2 is a flow-sheet illustrating a preferred means of purifying the acid, if necessary.

The terephthalic acid thus produced will generally contain from about 500 to 10,000 p.p.m. nitrogen, in the form of incompletely hydrolyzed nitrile products containing amide groups such as terephthalamic acid and perhaps also small amounts of ammonium groups from ammonium salts such as monoammonium terephthalate and ammonium terephthalamate which may not have been decomposed. Further purification may be necessary to the acid suitable for use in fiber manufacture. FIG. 2 shows a suitable purification process which can be combined with the process of FIG. 1.

The terephthalic acid from conveyor 17 is repulped in tank 60 with an aqueous recycle, for example, from line 24, and is passed through line 20, which passes through flash tank 65, in which the acid stream is preheated by flashing of product from hydrolysis vessel 63, and then into line 62. High pressure steam is introduced into line 62 through line 18, to bring the contents to hydrolysis temperature, and the combined stream introduced into hydrolysis vessel 63. Alternate means of heating the stream may be employed, such as utilizing line 62 as a furnace coil. In the hydrolysis vessel, the amide groups of the incompletely hydrolyzed compounds are further hydrolyzed to ammonium groups, forming diammonium terephthalate. Because of the corrosiveness of aqueous terephthalic acid, the hydrolysis vessel is suitably lined and passivated as known in the art to prevent corrosion and the consequent introduction of metallic impurities into the product. The reaction is conducted at about 300°–600° F., preferably 400°–550° F., at the autogenous pressure of the system, which may range from about 100 to about 1500 p.s.i.a., for 0.5–5 hours, preferably 1–3 hours.

The product from hydrolysis vessel 63, containing water, terephthalic acid, monoammonium terephthalate, small amounts of combined nitrogen and some diammonium terephthalate, (if the aqueous recycle stream in line 24 was used to repulp the terephthalic acid) is passed successively through flash tanks 65 and 66. In flash tank 65, the heat released by flashing is used to preheat the feed to hydrolysis vessel 63. The vapors from this flash are recovered in overhead line 85, condensed in heat exchanger 86 and returned to tank 65. Vapors from tank 66, comprising steam, are vented to the atmosphere through line 22.

The flashed products from tank 66 are passed through line 67 to centrifuge 68, where they are washed with an aqueous stream preferably a recycle stream introduced from line 35. Solid terephthalic acid is removed by means of conveyor 23. The liquid, which may contain small amounts of diammonium terephthalate and terephthalic acid, is removed via line 26, and may be used in various parts of the overall process as a wash or repulping liquid, or disposed of as waste.

If further purification is necesary, the solids from conveyor 23 are repulped in tank 69 with an aqueous stream, preferably recycle from line 34. The slurry is passed through line 27, preheated in flash tank 73, and conducted via line 70 into hydrolysis vessel 71. The materials are heated by high pressure steam introduced in line 19, or other suitable methods. A further hydrolysis is conducted, at approximately the same temperature, pressure and residence time as in vessel 63. The products are removed via line 72, flashed in tanks 73 and 74, and centrifuged in centrifuge 76 with deionized water introduced at line 32. The solid terephthalic acid is removed in conveyor 30, dried in drier 80 and recovered in hopper 82. The aqueous phase is removed in line 77 and may be divided into lines 31 and 25 as shown, with a portion used as aqueous recycle in various processing steps, and the remainder being disposed of as waste.

Monoammonium terephthalate formed during hydrolysis from terephthalamic acid will, in general, be recycled to the process through lines 26 and/or 24, to be ultimately recovered as terephthalic acid or passed to waste, e.g. through line 25. Alternatively, some of the salt may be converted to diammonium terephthalate and terephthalic acid according to the reaction:

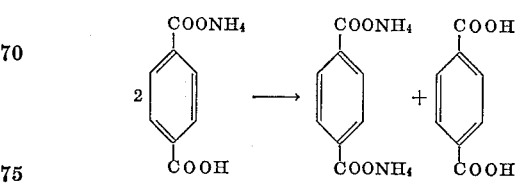

This reaction, carried out at low concentrations of monoammonium terephthalate in water, makes possible the production of some additional terephthalic acid from the half acid-half amide compound terephthalamic acid via hydrolysis of this compound to monoammonium terephthalate and the conversion of this product to terephthalic acid.

The hydrolysis, and, if necessary, the purification of other acids which can be produced by the present process, proceeds in analogous fashion, with appropriate modifications where necessary. In the hydrolysis of nitriles containing three or more nitrile groups, for example, the hydrolysis product will contain a greater number of compounds and, in particular, a mixture of ammonium salts of the acid. However, by appropriate regulation of the reaction conditions and stripping steam, the product can be controlled so as to contain predominantly one type of ammonium salt, e.g. monoammonium, diammonium, triammonium etc. Similarly, the residence time, temperature and stripping steam used in the decomposition step must be varied according to the number of ammonium groups to be removed, and the particular acid involved.

Acids such as terephthalic acid, pyromellitic acid, and 2,6-naphthalenedicarboxylic acid, which are primarily useful as starting materials for polyester fibers and resins, and diphenic acid, which is used in the pharmaceutical industry will, in most cases, require additional purification to remove nitrogenous impurities. In the appropriate circumstances, such as when the free acid is less soluble than its salts, purification can be accomplished by one or more further hydrolyses, as shown in FIG. 2. Other acids, however, may be sufficiently pure after leaving the decomposer to be used without further purification.

Modifications to the purification system shown in FIG. 2 may be made, according to the acid undergoing purification. For example, while terephthalic acid of sufficient purity can generally be produced using at most two additional hydrolyses, one, or three, or more might be required for other acids. Furthermore, while the system of FIG. 2 is the purification process presently preferred, it is not an essential part of the basic invention. Other processes which accomplish the same result may also be used.

When the present process is utilized to produce acids such as terephthalic acid, of which high purity is required, the nitrile which is the starting material should be substantially free of other nitriles. However, the nitrile may contain small quantities of corresponding amides and imides, since these will be converted to the product. For the production of acids in which such high purity may not be required, the nitriles may be obtained from the usual sources and may contain impurities which do not interfere with the hydrolysis.

Nitriles for which high purity is required may for example be produced by the process described in Canadian Patent 797,270, in which a lower alkyl aromatic hydrocarbon is reacted with ammonia in the presence of a fluidized catalyst and in the substantial absence of free oxygen. The preferred catalyst is a highly loaded fused transition metal oxide catalyst such as vanadium pentoxide or molybdenum trioxide fused on a suitable support, as disclosed in U.S. application 803,074, filed Feb. 27, 1969, commonly assigned. The reaction products are separated by quenching, as disclosed in the Canadian patent, and the product washed. It has been found that, in the production of terephthalonitrile, washing the product first with p-xylene and then with water aids in producing a product of sufficient purity.

In order to illustrate more fully the nature of the present invention and the manner of practicing the same, the following examples are presented:

Example 1

The following example illustrates the preparation of terephthalic acid from terephthalonitrile. All amounts given are in moles per hour.

A feed stream of the following composition is introduced into the top of hydrolysis column 42:

| | |
|---|---:|
| Water | 3933.33 |
| Terephthalonitrile | 75.30 |
| Ammonia | 69.65 |
| Monammonium terephthalte (MAT) (Recycle from line 11) | 16.50 |
| Diammonium terephthalate (DAT) (Recycle from lines 11, 15, 26) | 65.94 |
| Ammonium terephthalamate (ATA) (Recycle from line 11) | 24.30 |

The reaction is conducted over a period of 6 hours at a mean temperature of 400° F. and a mean pressure of 290 p.s.i.a. Stripping steam is introduced at the bottom through line 4, and is totally recovered in the overhead.

A bottoms product slurry of the following composition is removed from the column in line 5:

| | |
|---|---:|
| Water | 3634.17 |
| MAT | 92.89 |
| DAT | 62.82 |
| ATA | 26.34 |

Terephthalonitrile conversion is thus 100%. Of this amount, 2.04 moles per hour are converted to ammonium terephthalamate and the rest (73.26 moles/hr.) to monoammonium terephthalate. In addition, 3.12 moles per hour of diammonium terephthalate are partially stripped to the monoammonium salt. The overhead, in addition to the recovered stripping steam, contains 146 moles/hr. of ammonia. The water content of the slurry is reduced in flash tank 44, and the slurry centrifuged in 46. The centrifugate containing DAT, ATA and MAT, is recycled to the hydrolysis feed via lines 9 and 11.

A monoammonium terephthalate cake comprising 194.00 moles/hr. of water, 76.39 moles/hr. MAT, 2.04 moles/hr. ATA and 2.07 moles/hr. DAT is fed into one end of rotary kiln 50. The thermal decomposition is conducted at 530° F. for 2.25 hours. Five hundred moles/hr. stripping steam is utilized. The product contains 74.18 moles/hr. terephthalic acid, 0.11 moles/hr. undecomposed MAT and 2.04 moles/hr. of nitrogen containing impurities, mainly terephthalamic acid (from ATA). This amount of amide nitrogen will cause discoloration and other undesirable qualities in polymers formed from the terephthalic acid. If the acid is to be utilized for polymerization, the amides must be removed.

The product is therefore subjected to the purification system of FIG. 2. The product in line 20, is repulped with recycle stream 24, and hydrolyzed in vessel 63 with high pressure steam for 2 hours at 517° F. and 792 p.s.i.g.

The nitrogenous impurities (calculated as terephthalamic acid) content of the hydrolysis product is now only 0.24 moles/hr.; the MAT content is 1.91. Thus, nearly all the terephthalamic acid has been hydrolyzed to MAT. After flashing and centrifuging, the solid product containing the remaining terephthalamic acid is repulped with recycle stream 34 and passed to hydrolysis vessel 71. This stream, in line 27 now contains terephthalamic acid and terephthalic acid. The soluble DAT is removed in the centrifugate in line 26.

The hydrolysis is again conducted at 517° F. and 792 p.s.i.g. for 2 hours. All the remaining terephthalamic acid is converted to MAT, which again in this instance undergoes conversion into DAT and terephthalic acid. The final product comprises 75.30 moles/hr. of terephthalic acid with a combined nitrogen content of less than 20 p.p.m.

The increase in the amount of terephthalic acid over the product from rotary kiln 50 results from minor amounts of terephthalic acid being contained in recycle streams 24 and 34 used to repulp the solids and from the conversion of some of the MAT produced by hydrolysis of terephthalamic acid.

Example 2

A slurry of pyromellitonitrile (1,2,4,5-tetracyanobenzene) in water is introduced into the top of hydrolysis column 42. Ammonia is continuously introduced into the column. The reaction is conducted in a manner similar to that of Example 1, with steam being utilized as the stripping gas. A bottoms product comprising water, mono- di and tri-ammonium salts of pyromellitic acid, plus residual intermediate hydrolysis products is recovered. The slurry is flashed and centrifuged and this resulting solids passed to rotary kiln 50. In the kiln, the solids are heated, producing a product primarily comprising a mixture of pyromellitic acid and pyromellitic anhydride.

The product from the decomposition step will generally also include nitrogen containing hydrolysis intermediates, which must be removed if the acid or anhydride is to be utilized as a fiber monomer or in any other situation in which extreme purity is required. In such a case, the product is subjected to one or more further hydrolyses until the purity meets the necessary standard.

Example 3

A slurry of 1,2,5-tricyanobenzene and water is similarly hydrolyzed, the hydrolysis product centrifuged and the solids heated in a rotary kiln. The product comprises primarily a mixture of trimellitic acid and trimellitic anhydride.

Example 4

A slurry of 2,6-dicyanonaphthalene is similarly subjected to hydrolysis and decomposition. The product comprises primarily 2,6-naphthalenedicarboxylic acid. If further purification is necessary to remove nitrogen containing compounds, the product is subjected to one or more hydrolysis steps as per FIG. 2.

Various other embodiments and advantages of the invention, in addition to those disclosed herein, will be apparent to those skilled in the art. The invention therefore is not limited only to those items specifically disclosed, but is as defined in the following claims:

What is claimed is:

1. A continuous process for producing an aromatic polycarboxylic acid from the corresponding nitrile comprising:
   (a) introducing a mixture of the nitrile, water and a catalyst selected from the group consisting of ammonium salts into a hydrolysis vessel,
   (b) maintaining the mixture in the vessel at a temperature of from about 250° F. to about 500° F. for 1 to 12 hours,
   (c) contacting the mixture during step (b) countercurrently with gas to partially strip ammonia therefrom,
   (d) recovering an acid ammonium salt of the polycarboxylic acid,
   (e) heating the acid ammonium salt from about 0.5 to about 10 hours at a temperature of from about 300° F. to about 650° F. to produce the polycarboxylic acid and ammonia,
   (f) recovering the polycarboxylic acid.

2. The process of claim 1 wherein the polycarboxylic acid is a dicarboxylic acid.

3. The process of claim 1 wherein the polycarboxylic acid is a tricarboxylic acid.

4. The process of claim 1 wherein the polycarboxylic acid is a tetracarboxylic acid.

5. The process of claim 2 wherein the polycarboxylic acid is terephthalic acid.

6. The process of claim 2 wherein the polycarboxylic acid is phthalic acid.

7. The process of claim 2 wherein the polycarboxylic acid is a naphthalene dicarboxylic acid.

8. The process of claim 3 wherein the polycarboxylic acid is trimellitic acid.

9. The process of claim 4 wherein the polycarboxylic acid is pyromellitic acid.

10. The process of claim 1 wherein step (b) is conducted at a temperature of from about 350° F. to about 480° F. and a time of from about 3 to about 8 hours.

11. The process of claim 1 wherein step (e) is conducted at a temperature of from about 450° F. to about 575° F. for from about 0.5 to about 5 hours.

12. The process of claim 1 wherein the stripping gas of step (c) is steam.

13. The process of claim 12 wherein a portion of the steam introduced in step (c) to strip ammonia from the mixture is removed from the upper part of the hydrolysis vessel and the remainder is removed at one or more points in the hydrolysis vessel intermediate the upper part thereof and the point of introduction of the steam.

14. The process of claim 1 wherein the catalyst of step (a) is ammonia.

15. The process of claim 1 wherein the catalyst of step (a) is an ammonium salt of the polycarboxylic acid.

16. The process of claim 15 wherein an aqueous phase containing an ammonium salt of the polycarboxylic acid remains after the acid ammonium salt has been recovered in step (d), and is recycled to step (a).

17. A continuous process for producing an aromatic polycarboxylic acid from the corresponding nitrile comprising:
   (a) introducing a mixture of the nitrile, water and a catalyst selected from the group consisting of ammonia and ammonium salts into a hydrolysis vessel,
   (b) maintaining the mixture in the vessel at a temperature of from about 250° F. to about 500° F. for 1 to 12 hours,
   (c) contacting the mixture during step (b) countercurrently with gas to partially strip ammonia therefrom,
   (d) recovering an acid ammonium salt of the polycarboxylic acid,
   (e) heating the acid ammonium salt from about 0.5 to about 10 hours at a temperature of from about 300° F. to about 650° F. to produce the polycarboxylic acid and ammonia,
   (f) Repulping the polycarboxylic acid with water,
   (g) maintaining the mixture formed in (f) at a temperature of from about 300° F. to about 600° F. for from about 0.5 to about 5 hours,
   (h) recovering the polycarboxylic acid.

18. The process of claim 17 wherein the polycarboxylic acid is terephthalic acid.

19. The process of claim 17 wherein the polycarboxylic acid is pyromellitic acid.

20. The process of claim 17 wherein step (b) is conducted at a temperature of from about 350° F. to about 480° F. and a time of from about 3 to about 8 hours.

21. The process of claim 17 wherein step (e) is conducted at a temperature of from about 450° F. to about 575° F. for from about 0.5 to about 5 hours.

22. The process of claim 17 wherein the stripping gas of step (c) is steam.

23. The process of claim 22 wherein a portion of the steam introduced in step (c) to strip ammonia from the mixture is removed from the upper part of the hydrolysis vessel and the remainder is removed at one or more points in the hydrolysis vessel intermediate the upper part thereof and the point of introduction of the steam.

24. The process of claim 17 wherein the catalyst of step (a) is ammonia.

25. The process of claim 17 wherein the catalyst of step (a) is an ammonium salt of the polycarboxylic acid.

26. The process of claim 25 wherein an aqueous phase containing an ammonium salt of the polycarboxylic acid remains after the acid ammonium salt has been recovered in step (d), and is recycled to step (a).

27. A process for producing an acid ammonium salt of an aromatic polycarboxylic acid from the corresponding nitrile comprising:
   (a) Introducing a mixture of the nitrile, water and a catalyst selected from the group consisting of ammonia and ammonium salts into a hydrolysis vessel,
(b) maintaining the mixture in the vessel at a temperature of from about 250° F. to about 500° F. for 1 to 12 hours,
(c) contacting the mixture during step (b) countercurrently with gas to partially strip ammonia therefrom, and
(d) recovering an acid ammonium salt of the polycarboxylic acid.

28. The process of claim 27 wherein the polycarboxylic acid is a dicarboxylic acid.

29. The process of claim 28 wherein the polycarboxylic acid is terephthalic acid.

30. The process of claim 28 wherein the polycarboxylic acid is phthalic acid.

31. The process of claim 27 wherein the polycarboxylic acid is pyromellitic acid.

32. The process of claim 27 wherein the polycarboxylic acid is trimellitic acid.

33. A process for purifying an aromatic polycarboxylic acid, produced by the process of claim 1 and containing incomplete hydrolysis products of the nitrile, comprising:
(a) forming an aqueous slurry of the polycarboxylic acid;
(b) maintaining the slurry at a temperature of from about 300° F. to about 600° F. for from about 0.5 to about 5 hours; and
(c) recovering purified polycarboxylic acid.

34. The process of claim 33 wherein step (b) is conducted at a temperature of from about 450° F. to about 575° F.

35. The process of claim 33 further comprising subjecting the product of step (b) to a flashing step to cool the product and remove a portion of the contained water by flash evaporation.

36. The process of claim 33 wherein the slurry is brought to the temperature of step (b) by direct contact with high pressure steam.

37. The process of claim 33 wherein the impurities comprise amides.

38. The process of claim 33 wherein the polycarboxylic acid is terephthalic acid.

References Cited

FOREIGN PATENTS 2,008,129  9/1971  Germany.

JAMES A. PATTEN, Primary Examiner

U.S. Cl. X.R.

260—293.88, 347.3, 515 A, 518 R, 521 R